United States Patent
Bastide et al.

(10) Patent No.: US 10,511,806 B2
(45) Date of Patent: Dec. 17, 2019

(54) MITIGATING EFFECTS OF DISTRACTING SOUNDS IN AN AUDIO TRANSMISSION OF A CONVERSATION BETWEEN PARTICIPANTS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/721,812

(22) Filed: Sep. 30, 2017

(65) Prior Publication Data
US 2019/0104280 A1    Apr. 4, 2019

(51) Int. Cl.
| H04N 7/15 | (2006.01) |
| H04M 3/22 | (2006.01) |
| H04M 3/56 | (2006.01) |
| H04N 21/4788 | (2011.01) |
| H04N 21/422 | (2011.01) |
| H04R 1/10 | (2006.01) |

(52) U.S. Cl.
CPC ............ *H04N 7/15* (2013.01); *H04M 3/2227* (2013.01); *H04M 3/568* (2013.01); *H04N 21/42203* (2013.01); *H04N 21/4788* (2013.01); *H04R 1/1083* (2013.01); *H04M 2203/2038* (2013.01); *H04M 2203/654* (2013.01)

(58) Field of Classification Search
CPC . G10L 21/02; G10L 21/0202; G10L 21/0208; G10L 21/10; G10L 25/60; H04M 3/56; H04M 3/568; H04R 1/1083
USPC ............... 704/226, 227, 228, 270; 370/260; 381/56
See application file for complete search history.

(56) References Cited

U.S. PATENT DOCUMENTS

| 6,888,935 B1 * | 5/2005 | Day | H04M 3/568 |
| | | | 370/260 |
| 7,065,487 B2 * | 6/2006 | Miyazawa | G10L 15/20 |
| | | | 704/233 |

(Continued)

OTHER PUBLICATIONS

N/A; Ttl: Conference Call Etiquette: Are You an Offender; Publication Ttl: PR Newswire; 2015; Publisher: PR Newswire Association LLC; Country of Publication: USA; ISSN: N/A; Database: Gale Group New Product Announcements.

(Continued)

*Primary Examiner* — Martin Lerner
(74) *Attorney, Agent, or Firm* — Anthony V. S. England; L. Jeffrey Kelly; Susan M. Maze (57) ABSTRACT

For an audio transmission, a computer system detects sounds in the audio transmission, where the audio transmission is for participants in a conversation and the conversation includes spoken word sounds of the participants. The method includes determining, by the computer system, that one of the sounds is transmitted from where one of the participants is located and that the one of the sounds indicates a distraction. Responsive to determining that that one of the sounds indicates a distraction, the computer system generates a predetermined action to mitigate the distraction.

20 Claims, 3 Drawing Sheets

(56) References Cited

U.S. PATENT DOCUMENTS

| | | | |
|---|---|---|---|
| 7,187,764 B2* | 3/2007 | Ruetschi | H04M 3/56 |
| | | | 370/260 |
| 7,295,982 B1* | 11/2007 | Cohen | G10L 25/69 |
| | | | 704/270 |
| 7,545,923 B1* | 6/2009 | Campion | H04M 3/56 |
| | | | 379/1.01 |
| 7,739,109 B2 | 6/2010 | Rui | |
| 8,170,200 B1 | 5/2012 | Chu et al. | |
| 8,515,041 B2 | 8/2013 | Byrne et al. | |
| 8,767,922 B2 | 7/2014 | Kanevsky et al. | |
| 9,042,535 B2 | 5/2015 | Ramalingam et al. | |
| 9,237,238 B2 | 1/2016 | Chu et al. | |
| 9,349,384 B2* | 5/2016 | Gunawan | G10L 21/0324 |
| 9,560,316 B1* | 1/2017 | Lindberg | G10L 21/10 |
| 9,876,913 B2* | 1/2018 | Cartwright | G10L 21/02 |
| 9,966,085 B2* | 5/2018 | Song | G10L 21/0208 |
| 10,142,483 B2* | 11/2018 | Li | H04M 3/568 |
| 2009/0225970 A1 | 9/2009 | Grigsby | |
| 2011/0096137 A1* | 4/2011 | Baker | H04N 7/147 |
| | | | 348/14.08 |
| 2011/0187814 A1* | 8/2011 | Nimri | G10L 21/00 |
| | | | 704/275 |
| 2012/0166188 A1* | 6/2012 | Chakra | G10L 21/0208 |
| | | | 704/226 |
| 2014/0023184 A1 | 1/2014 | Jachner | |
| 2014/0278380 A1* | 9/2014 | Gunawan | G10L 21/0208 |
| | | | 704/205 |
| 2015/0228293 A1* | 8/2015 | Gunawan | G10L 21/0272 |
| | | | 704/225 |
| 2015/0348530 A1* | 12/2015 | Findlay | G10L 21/0208 |
| | | | 381/309 |
| 2016/0086619 A1* | 3/2016 | Pogorelik | H03G 3/32 |
| | | | 381/57 |
| 2016/0309252 A1* | 10/2016 | Geiger | G10L 15/26 |
| 2017/0193982 A1* | 7/2017 | Agrawal | G10L 21/10 |
| 2017/0371615 A1* | 12/2017 | Gummadi | H04M 3/568 |
| 2018/0048768 A1* | 2/2018 | Spittle | H04M 3/568 |
| 2018/0181366 A1* | 6/2018 | Bowling | G10L 19/018 |
| 2018/0336001 A1* | 11/2018 | Abuelsaad | G10L 21/0272 |

OTHER PUBLICATIONS

Dufaux et al. "Automatic Sound Detection and Recognition for Noisy Environment", Proceedings of EUSIPCO 2000, European Signal Processing Conference 2000, Tampere, Fla. Sep. 5-8, 2000.
Castelli E, Vacher M, Istrate D, Besacier L, Serignat JF. Habitat telemonitoring system based on the sound surveillance. Proceedings of the International Conference on Information Communication Technologies in Health; 2003.

* cited by examiner

MITIGATING EFFECTS OF DISTRACTING SOUNDS IN AN AUDIO TRANSMISSION OF A CONVERSATION BETWEEN PARTICIPANTS

BACKGROUND

Meetings are a common way to do business. ("Meetings," as used herein, includes telephone conference calls and web conferences.) Distractions are inevitable in meetings. One way that people deal with telephone meeting distractions is for the participant at the source of the sound to switch their device to a mute mode. Another known way is to provide an anti-noise, i.e., a noise that is approximately the opposite of the distraction noise. Although its effectiveness has been questioned, such anti-noise has famously been provided for use by home viewers of televised South African World Cup football matches, so they could play the anti-noise at home in an effort to counteract the noise of vuvuzela horns.

SUMMARY

In a method for an audio transmission, a computer system detects sounds in the audio transmission. The audio transmission is for participants in a conversation, and the conversation includes spoken word sounds of the participants. The computer system determines that one of the sounds is transmitted from where one of the participants is located and that the one of the sounds indicates a distraction. When one of the sounds indicates a distraction, the computer system generates a predetermined action to mitigate the distraction.

System and computer program products relating to the above-summarized method are also described and claimed herein.

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

People set up meetings to accomplish specific goals, of course. They often face trouble, however, where they must deal with conflicts of attention in a meeting. For instance, Alice sets up a meeting "Tiger Fans of America: Weekly Meeting." Alice adds Bob, Charlie and Doug to the meeting. During the meeting a dog barks, which may distract the participants beyond just the momentary, unintended intrusion. For example, after the barking Bob disappears to deal with his barking dog and Charlie's mind wanders to thinking about walking his own dog after the meeting. It is an advantage of what is herein disclosed that such distractions are smoothed over.

Figure 1:
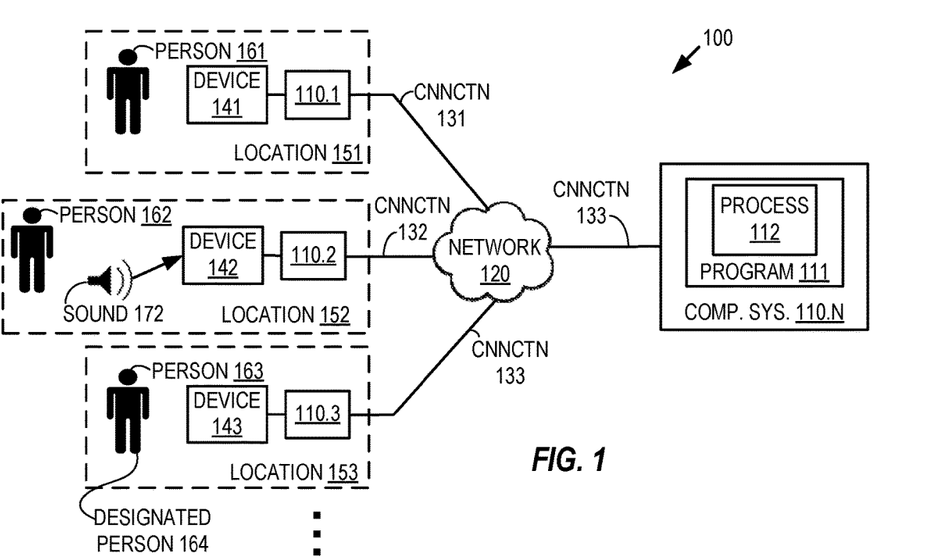
FIG. 1 is a block diagram for a networked system, method and computer program product that mitigates conflicts of attention in meetings.

Referring now to FIG. 1, a block diagram is shown for a networked system, method and computer program product that mitigate conflicts of attention in meetings, according to embodiments of the present invention. As shown, environment 100 includes computer systems 110.1, 110.2, 110.3 through 110.N connected via network 120, which may be public or private. Systems 110.1, 110.2, etc. include modules, which may be program or hardware modules, configured to perform tasks for their own respective systems or for other systems or both. In various instances, message communication via network 120 may include communication via protocols for email, voice, instant message, text message or proprietary protocols.

In the illustrated instance, Alice sets up a meeting, such as "Tiger Fans of America: Weekly Meeting" in an example scenario, wherein Alice is a first participant 161. For the meeting, Alice adds Bob, Charlie, etc. as second, third etc. participants 162, 163, etc. In this example, the participants 161, 162, 163, etc. are at their own respective locations 151, 152, 153, etc. They all join the meeting via a telephone or Internet network, such as network 120, as shown. A module of a computer program 111, provided according to an embodiment of the present invention, is running on a computer system 110.N and thereby generating a process 112. Computer system 110.N is connected via a network connection 133 to network 120 or has an audio coupling, such that process 112 is configured to hear sounds generated by transmitters of the respective participants 161, 162, 163, etc. on their respective 120 connections 131, 132, 133, etc., from their respective telephone or headset devices 141, 142, 143, etc.

This includes, for example, computer process 112 detecting a potentially distracting sound 172 on network 120 transmission of the meeting. In the illustrated instance, potentially distracting sound 172 arises in location 152 of participant 162 and, correspondingly, is transmitted to the other participants 161, 163, etc. via connection 132. A distraction may be indicated by the sound of a dog barking, baby crying, loud keyboard typing, dish dropping, tea kettle boiling, etc. Process 112 automatically determines whether sound 172 is distracting enough to react to and, when it is distracting enough, process 112 determines a level of distraction due to the noise and automatically determines an action as an antidote based on the level of distraction.

In one alternative, since each person 161, 162, 163, etc. is connected to network 120 for the meeting by their own respective connection 131, 132, 133, etc., e.g., an Internet or telephone network connection, process 112 thereby uniquely associates each participant 161, 162, 163, etc. with their own respective connection 131, 132, 133, etc. Process 112 may be initialized to identify one particular one of participants 161, 162, 163, etc. as a designated person 164. Process 112 will send one or more prompts for action to the designated participant 164, as described herein below.

In one example, an action antidote that process 112 selects and prompts for may be a joke or a sarcastic comment for the designated person to recite. In another example, the antidote may be a prompt suggesting that the designated person receiving the prompt should summarize a most recent section of the call, if the call is divided in a way such that the system, method or computer program product can determine the most recent section. Alternatively, the antidote may be a prompt suggesting that the receiver say something to reinforce the last 30 seconds of the call. For example, through audio/video capture, process 112 may summarize the last few minutes in a replay or video replay of the prior few seconds, so as to create a transition over/around the distraction, e.g., dog bark. Or it may be a prompt to recite at least a portion of the agenda. Still further, process 112 may determine that the call includes a web conference aspect, in which case the antidote may be a prompt for the designated person to interact with an application controlling the web conference in such a way as to change an image presented to the participants via their Internet browsers. For example, the prompt may indicate for the designated person to change the image to an image of the written agenda. Alternatively, process 112 may provide the receiver an attention-grabbing image to present, such as an image of cartoon character smiling while pointing at the agenda, or an image of the last time the meeting attendees met.

Figure 2:
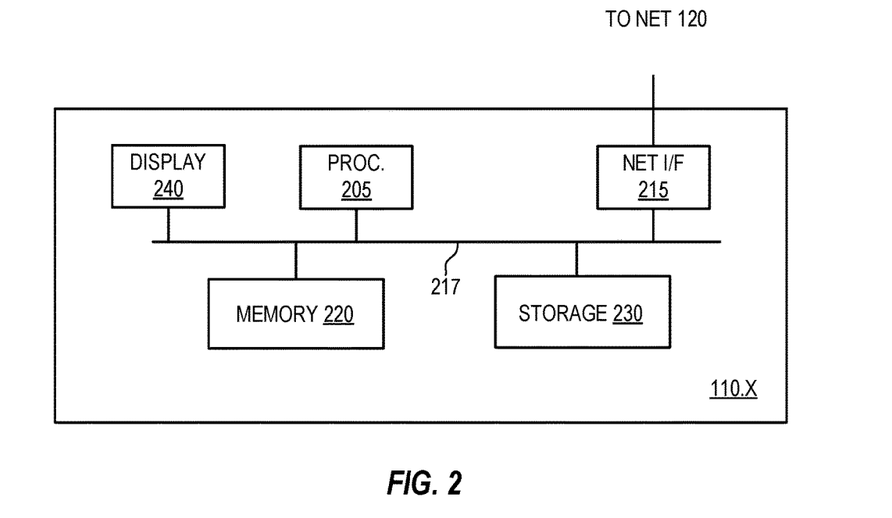
FIG. 2 is a block diagram of a computer system, according to an embodiment of the present invention.

FIG. 2 illustrates a block diagram of a computer system 100.X that is suitable as computer systems 110.1, 110.2, etc., according to embodiments of the present invention, wherein system 100.X includes at least one central processing unit (CPU) 205, network interface 215, interconnect (i.e., bus) 217, memory 220, storage device 230 and display 240. CPU 205 may retrieve and execute programming instructions stored in storage device 230 for applications. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random-access memory, which includes retrieved data and program modules for run-time execution, according to embodiments of the present invention. It should be understood that system 200 may be implemented by other hardware and that one or more modules thereof may be firmware.

Figure 3:
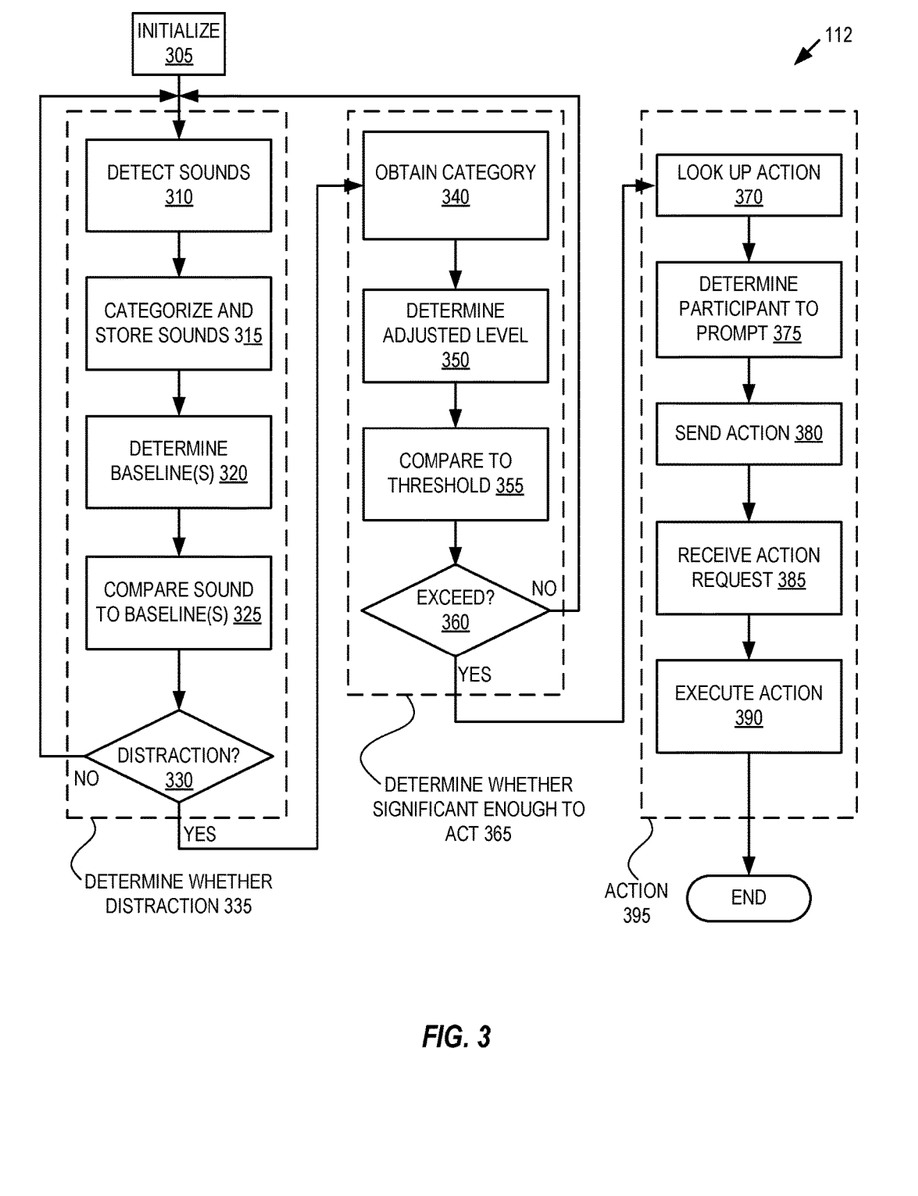
FIG. 3 is a flowchart illustrating a method for an audio transmission of a meeting is illustrated, according to an embodiment of the present invention.

FIG. 3 is a flowchart illustrating a method 112 for an audio transmission of a meeting is illustrated, according to an embodiment of the present invention. (Herein, an "audio transmission" may include a transmission of both audio and video, of course.) Method 112 includes detecting, by a computer system, sounds in the audio transmission, where the audio transmission is for parties to a conversation and the conversation includes spoken word sounds of the parties. For a sound transmitted from where one of the participants is located, the computer system determines 335 whether the sound indicates a distraction. (Herein, there may be a reference to detecting occurrence of a distraction from one of the participants. It should be understood that this includes detecting occurrence of a distraction from more than one of the participants, of course, since when there is a distraction from more than one participant, there is a distraction from one of them.) Responsive to the determining that a distraction is transmitted from where one of the participants is located, the computer system determines 365 whether the distraction is significant enough to act upon and, if so, generates 395 an action as an antidote to mitigate the distraction, which includes sending a notice for prompting the action.

More specifically, determining 335 whether the sound indicates a distraction may include detecting 310 spoken words of the participants and sounds ("other" sounds) that are other than the spoken words. When one of the participant's dog barks, for example, process 112 detects 310 the sound of the barking and may, according to at least some embodiments of the present invention, also determine 315 by audio signal analysis that the barking is a different sound category than the sound of spoken words of the meeting participants. More generally, in an embodiment of the present invention, the analysis may identify 315 whether any detected sound matches a human voice. (For determining this, signal analysis that is known in the prior art may be applied by process 112. This may include performing spectral analysis of detected sounds, comparing detected sounds and performing other operations. A program or algorithm such as Shazam's music recognition or Fast Fourier Transformation may be applied for this, for example, as may others.

According to an embodiment of the present invention, process 112 may, in response to determining 315 that a sound is a different sound than that of spoken words, directly continue to determine 365 whether the sound is significant enough for taking an action, i.e., without determining 320 baseline(s) as described herein below, and without comparing 325 the dog barking sound to any baselines as also described herein below.

When the sound is not the sound of spoken words, as in the illustrated instance of a barking sound, process 112 may also categorize 315 the sound and store it for further analysis in computer readable storage media, according to one or more embodiments of the present invention. (The further analysis may include, for example, historical analysis as described herein below.) For example, the sound may be categorized generally on several dimensions. This may include identifying one or more of i) loudness, ii) tones, such as frequency of each harmonic, iii) roughness, iv) sharpness, v) boom, and vi) temporal nature, which may include identifying number of bursts, lengths of each burst, times between bursts, number of repetitions of groups of bursts, etc. In another example, the sound may also (or alternatively) be categorized as a recognizable sound, such as dog barking, baby crying, loud keyboard typing, dish dropping, tea kettle boiling, etc., which may done by comparing ones of the measured dimensions of the sound as described above to dimensions of recognizable sounds in a stored library, according to an embodiment of the present invention.

In one aspect, process 112 may determine 320, by audio signal analysis, a historical, i.e., baseline, level for the sounds of spoken words of the participants detected at 310, a baseline level for other sounds detected at 310, respective baseline levels for each or a single baseline level for both, according to different embodiments of the present invention. Such a baseline may include average, variance and range of categorization aspects such as described herein above regarding the detected sounds. Although it is not necessarily known to determine a baseline level for sounds of spoken words or other sounds in a meeting or conversation, particularly not in the context of embodiments of the present invention, a way of doing audio signal analysis that is known in the prior art may be applied by process 112 for determining this. For example, a program such as Fast Fourier Transformation may be applied.

In connection with determining 320 baselines and responsive to analysis of the historical sounds, process 112 may adjust values in a distraction level table described herein below. That is, for example, process 112 may compare the type of noise, which may include length and other audio characteristics, against historic occurrences. For instance, a dog barking on a single call may be common and therefore ignored by the general population. For instance, a car honking in the background may be uncommon and disrupt the population. The historic occurrences may be based on specific users, groups, cohorts or meeting times. Accordingly, process 112 may reduce a value otherwise assigned in the table to the distraction level of dog barking for a particular set of users at a particular meeting time, but not reduce the value for car honking noise.

In a further aspect, process 112 compares 325 the sound of the captured potential distraction, e.g., dog barking sound, to the determined 320 baseline level of the sounds of the spoken words, or to the baseline level of the other sounds, or to both baselines or to a single combined baseline, according to different embodiments of the present invention. Responsive to exceeding 330 (yes) the level, process 112 continues on to determine 365 a distraction significance level, which process 112 uses for deciding whether to generate 395 an action and what action to generate, if any. Otherwise, responsive to not exceeding the level 330 (no), process 112 branches back to wait for more sounds to detect 310.

According to an embodiment of the present invention, process 112 determines 365 a significance level of the distracting sound. This may include determining 340 one or more category of the sound, such as by retrieving a category or categories determined at 315, if that was done, or performing the categorization 315 described herein above. Process 112 may further determine 365 significance level of the distracting sound responsive to loudness of the sound. This determination may be independent of the level of the baseline sounds in one embodiment of the present invention. Alternatively, in another embodiment the distraction level may be relative to the level of the spoken word baseline sound or the baseline of the other sounds, or both, where the relative level may be expressed as a ratio of levels.

In an example where process 112 determines a distraction level that is relative to the spoken word baseline, according to an embodiment, if the distracting sound has been determined to be a recognizable category, e.g., dog barking, and if loudness of the dog barking and the spoken word baseline are within a predetermined range of one another, such as +/−10%, for example, in one embodiment process 112 assigns a unity level for a loudness aspect of the distraction level, i.e., a loudness level of "1." If the loudness of the dog barking is outside the range and is less than that of the spoken words, the process assigns an indication of less than unity for the loudness aspect of the distraction. If the loudness of the dog barking is outside the range and is greater than that of the spoken words, the process assigns a proportional level of more than unity for the loudness aspect of the distraction level.

In another aspect of assigning a distraction level to the sound, i.e., dog barking sound in this example, process 112 may also take duration of the sound into account. For example, for longer duration sounds, process 112 may adjust the loudness aspect upward, whereas for shorter durations process 112 may adjust the loudness aspect downward.

Based on categorizing 340 the distracting sound, such as a dog barking sound as described above, and further based on determining 350 the loudness aspect of the distracting sound, such as also described above, process 112 responsively determines an adjusted level of distraction for the sound, in one embodiment of the present invention. For example, this may include process 112 looking up a predefined, stored value associated with the recognizable, "dog barking" category of sounds in one dimension and associated with the particular loudness in another dimension. That is, the stored distraction level values for dog barking are higher for louder, longer duration barking, thereby indicating a more distracting sound. Further, some categories of sound are deemed more distracting than others and have higher values in a predetermined table of distraction levels. For example, for the same sound level, the predetermined table may have a higher distraction level values for a tea kettle whistling than for dog barking, which may be due to tone, roughness, etc. of the sound and may also be due to a meaning that the participants tend to associate with the sound.

Loudness and duration have been used in the above examples, wherein process 112 determines significance level of the distracting sound responsive to recognizable category, loudness and duration of the sound. However, it should be understood that process 112 may apply additional or different aspects for determining distraction significance level, such as aspects described for categorizing sounds herein above, for example. In another example, as part of categorizing 315 transmitted sounds that it detects, process 112 may determine there is more than one participant at a single location and that a distracting sound is being transmitted from that location. In response to making this determination about more than one participant at the location, process 112 may, as part of determining 350 an adjusted distraction level, increase the significance level of the distracting sound from that location.

Process 112 then compares 355 the determined distraction level to a predefined threshold level to determine whether the distraction level is high enough that process 112 will undertake 395 mitigating action. If the distraction level exceeds 360 (yes) the threshold level, process 112 proceeds to generate 395 one or more action antidotes from a predetermined set of stored actions. Otherwise, responsive to not exceeding the level 360 (no), process 112 branches back to wait for more sounds to detect 310.

In one aspect regarding process 112 generating 395 actions, according to an embodiment of the present invention, process 112 looks up 370 actions and selects one or more based on the distraction level that was determined. That is, stored action antidotes are predefined in categories according to a ranking that indicates their power, where more powerful action antidotes are stored for selection responsive to higher distraction levels. Lower power action antidotes may be less intrusive. Less intrusive actions may be more useful for less significant distractions, because less intrusive actions may be sufficient to more quickly refocus attention to important aspects of the meeting, whereas more intrusive action antidotes may take longer for participants to process, thereby taking longer to refocus attention. Examples of less intrusive, less powerful action antidotes include a snippet of jazz music, according to an embodiment of the present invention. Examples of more intrusive, more powerful action antidotes include car horns or a puzzle for participants to solve, according to an embodiment of the present invention.

In one aspect regarding process 112 generating 395 actions, according to an embodiment of the present invention, process 112 determines 375 the participant to prompt. Process 112 may identify and designate a participant to prompt by his/her respective connection to the network. For example, process 112 may be configured to designate one of the participants who is/are chairing the meeting. For example, process 112 may be configured to designate one of the participants who slated to make a presentation at the meeting. Information such as this about participants may be provided to process 112 in an initialization 305 by one of the participants who sets up the meeting, such as before the meeting it starts. Alternatively, the process 112 may designate the person dynamically, where at the time of a distracting sound process 112 determines who is talking or providing a presentation shown by a web-based conference application to the participants and selects (designates) that person as the one that process 112 will prompt for that particular distraction.

Process 112 may be configured at initialization 305 by a user setting up the meeting such that process 112 determines 375 the participant to prompt independently of where the noise arises, such as in an instance where process 112 is initialized with a static configuration to designate one of the participants who is/are chairing the meeting or an instance where process 112 is initialized with a dynamic configuration to designate one of the participants who is talking making a presentation. Alternatively, process 112 is configured at initialization 305 for dynamically taking into account the connection from which the distracting noise arises, which indicates a participant with whom the noise is associated. (This person or connection may be referred to herein as the "distraction source.") In response to determining the connection from which the distracting noise arises, according to one embodiment of the present invention, process 112 selects, as the designated person, one of the participants who is not the distraction source and then automatically prompts the designated participant to execute the determined antidote. In this configuration, process 112 may select the participant dynamically, in addition to dynamically determining the distraction source. That is, at the time of a distracting sound, process 112 determines who is talking or providing a presentation shown by a web-based conference application to the participants, and process 112 responsively selects (designates) that person as a candidate to be the designated participant that process 112 will prompt for that particular distraction. However, process 112 is configured at initialization 305 such that if process 112 determines the candidate is also the distraction source, process 112 designates 375 the person who is controlling the meeting.

Once process 112 has looked up and selected 370 one or more action antidotes and designated 375 a participant to prompt, process 112 sends 380 the action(s), i.e., notifies the designated participant of the action(s). In response to receiving 385 a request from the designated participant to execute the action, process 112 executes 390 the action. It should be appreciated that process 112 returns to detecting sounds 310 and process 315, etc., upon executing 390 the action and that process 112 may concurrently detect 310 and process 315, etc., more than one sound in parallel throughout all the other processing described in FIG. 3.

Figure 4:
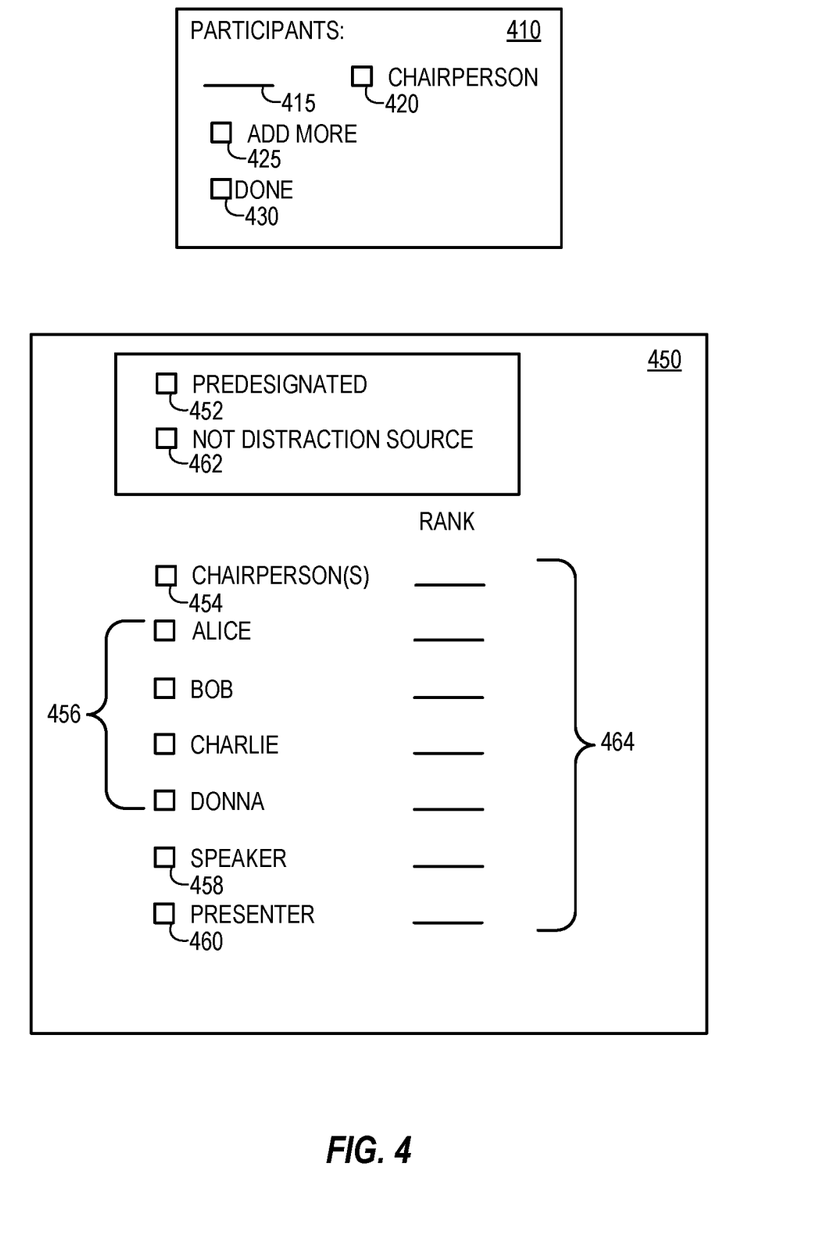
FIG. 4 illustrates two user interface features of a computer program running on a computer system, according to an embodiment of the present invention.

Referring now to FIG. 4 in connection with FIG. 3, process 112 may be configured at initialization 305 by a computer system user setting up a meeting. To enable initialization, process 112 may generate user interface aspects 410 and 450 on the computer system and present them on a display of the system to a user.

User interface aspect 410, which may be a frame or a window, for example, is configured to receive, in a first input field 415 from the user performing the initialization, identification of a meeting participant, such as an email address or other user identification, and to receive, in a selection 420 input field, an indication whether the meeting participant is a chairperson of the meeting. The interface aspect 410 also includes an input field 425 for receiving an indication that the user wants to enter identification, etc. for another meeting participant and an input field 430 for receiving an indication that the user has entered all meeting participants. If the user selects input field 425, process 112 generates another set of input fields 415 and 420 to receive input User interface aspect 450, which may be a frame or a window, provides an input field 452 configured to receive an indication from the user that a selected participant is predesignated to receive prompts for action antidotes to mitigate distractions, i.e., regardless of whether the predesignated participant is a source of the distraction that gives rise to a particular prompt. User interface aspect 450 provides an alternative input field 462 that is configured to receive an indication from the user that in order to receive prompts for action antidotes to mitigate distractions a selected participant must NOT be the distraction source that gives rise to a particular prompt.

In user interface aspect 450, process 112 also presents the names of participants the user has entered in user interface aspect 410, where the names in user interface aspect 450 are presented under a input field 452 that is configured to receive an indication from the user that a selected participant is predesignated to receive prompts for action antidotes to mitigate distractions. User interface aspect 450 also includes input fields 456 configured to receive indication(s) from the user of named participant(s) to receive such prompts. User interface aspect 450 includes an input field 454 configured to receive an indication from the user that chairperson(s) are to receive such prompts, i.e., participant(s) indicated as chairperson(s) in field 420 of user interface aspect 410. User interface aspect 450 also includes input field 458 configured to receive an indication from the user that such a prompt should be sent to a participant who is speaking at the time of a distraction. User interface aspect 450 also includes input field 460 configured to receive an indication from the user that such a prompt should be sent to a participant who is presenting at the time of a distraction.

If the user configures process 112 via input 462 such that process 112 will not prompt a participant who is the distraction source giving rise to the prompt, then any of the participants may be excluded from receiving a prompt for an instance of a distraction. Consequently, user interface aspect 450 also includes input fields 464 configured to receive user inputs ranking the selected participants. When process 112 is configured not to prompt a participant who is the distraction source giving rise to the prompt, process 112 uses the ranking of participants to select which participant to send a prompt to for an instance of a distraction. That is, when configured via input 462, process 112 sends a prompt to the highest ranked participant who is NOT the distraction source giving rise to the prompt.

The above-described examples and depictions in the Figures are not meant to imply architectural limitations. For example, any of devices 110.1, 110.2, etc. may be a notebook computer, hand held computer, smart phone, kiosk, etc. Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method for an audio transmission, the method comprising:
   detecting, by a computer system, sounds in the audio transmission, where the audio transmission is for participants in a current conversation and the current conversation includes spoken word sounds of the participants and sounds other than spoken words;

determining, by the computer system, that a certain sound of the sounds in the audio transmission is transmitted from where one of the participants is located;

determining that the certain sound is a sound other than spoken words by finding a matching sound in a library of stored sounds, wherein the matching sound is a sound from a certain recognizable type of sound source other than spoken words;

determining, by the computer system, that the certain sound indicates a distraction in response to the determining that the matching sound is from the certain recognizable type of sound source other than spoken words;

determining a distraction significance level for the matching sound by the computer system based on a loudness level of the certain sound of the sounds in the audio transmission and based on a stored value for the certain recognizable sound source other than spoken words, wherein the determining the distraction significance level includes adjusting the stored value based on meaningfulness of the certain recognizable sound source to the participants in the current conversation; and generating a predetermined action to mitigate the distraction by the computer system in response to the distraction significance level exceeding a predetermined threshold.

2. The method of claim 1, where the action includes providing a recommendation to one of the participants.

3. The method of claim 2, where the recommendation is selected from a group consisting of playing a sound track related to a detected noise, displaying an image, and commenting.

4. The method of claim 2, where providing the recommendation includes providing a recommendation to one of the participants who is not at the location of the one of the sounds.

5. The method of claim 2, where the one of the participants is a current speaker.

6. The method of claim 1, wherein the determining the distraction significance level includes adjusting the stored value based on time of day of the conversation.

7. The method of claim 1, wherein the determining the distraction significance level includes adjusting the stored value based the number of participants at a location that has a recognizable sound source.

8. A system for audio transmission, the system comprising:

a processor; and a computer readable storage medium connected to the processor, where the computer readable storage medium has recorded thereon a program for controlling the processor, and where the processor is operative with the program to execute the program for:

detecting, by a computer system, sounds in the audio transmission, where the audio transmission is for participants in a current conversation and the current conversation includes spoken word sounds of the participants and sounds other than spoken words;

determining, by the computer system, that a certain sound of the sounds in the audio transmission is transmitted from where one of the participants is located;

determining that the certain sound is a sound other than spoken words by finding a matching sound in a library of stored sounds, wherein the matching sound is a sound from a certain recognizable type of sound source other than spoken words;

determining, by the computer system, that the certain sound indicates a distraction in response to the determining that the matching sound is from the certain recognizable type of sound source other than spoken words;

determining a distraction significance level for the matching sound by the computer system based on a loudness level of the certain sound of the sounds in the audio transmission and based on a stored value for the certain recognizable sound source other than spoken words, wherein the determining the distraction significance level includes adjusting the stored value based on meaningfulness of the certain recognizable sound source to the participants in the current conversation; and generating a predetermined action to mitigate the distraction by the computer system in response to the distraction significance level exceeding a predetermined threshold.

9. The system of claim 8, where the action includes providing a recommendation to one of the participants.

10. The system of claim 9, where the recommendation is selected from a group consisting of playing a sound track related to a detected noise, displaying an image, and commenting.

11. The method of claim 9, where providing the recommendation includes providing a recommendation to one of the participants who is not at the location of the one of the sounds.

12. The method of claim 9, where the one of the participants is a current speaker.

13. The system of claim 8, wherein the determining the distraction significance level includes adjusting the stored value based on time of day of the conversation.

14. The system of claim 8, where the determining the distraction significance level includes adjusting the stored value based the number of participants at a location that has a recognizable sound source.

15. A computer program product for an audio transmission, including a computer readable storage medium having instructions stored thereon for execution by a computer system, where the instructions, when executed by the computer system, cause the computer system to implement a method comprising:

detecting, by a computer system, sounds in the audio transmission, where the audio transmission is for participants in a current conversation and the current conversation includes spoken word sounds of the participants and sounds other than spoken words;

determining, by the computer system, that a certain sound of the sounds in the audio transmission is transmitted from where one of the participants is located;

determining that the certain sound is a sound other than spoken words by finding a matching sound in a library of stored sounds, wherein the matching sound is a sound from a certain recognizable type of sound source other than spoken words;

determining, by the computer system, that the certain sound indicates a distraction in response to the determining that the matching sound is from the certain recognizable type of sound source other than spoken words;

determining a distraction significance level for the matching sound by the computer system based on a loudness level of the certain sound of the sounds in the audio transmission and based on a stored value for the certain recognizable sound source other than spoken words, wherein the determining the distraction significance level includes adjusting the stored value based on meaningfulness of the certain recognizable sound source to the participants in the current conversation; and generating a predetermined action to mitigate the distraction by the computer system in response to the distraction significance level exceeding a predetermined threshold.

16. The computer program product of claim 15, where the action includes providing a recommendation to one of the participants.

17. The computer program product of claim 16, where the recommendation is selected from a group consisting of playing a sound track related to a detected noise, displaying an image, and commenting.

18. The computer program product of claim 16, where providing the recommendation includes providing a recommendation to one of the participants who is not at the location of the one of the sounds.

19. The computer program product of claim 15, wherein the determining the distraction significance level includes adjusting the stored value based on time of day of the conversation.

20. The computer program product of claim 15, where the determining the distraction significance level includes adjusting the stored value based the number of participants at a location that has a recognizable sound source.

* * * * *